(12) United States Patent
Koshelev et al.

(10) Patent No.: US 11,567,255 B1
(45) Date of Patent: Jan. 31, 2023

(54) WAVEGUIDE ILLUMINATOR HAVING SLAB WAVEGUIDE PORTION

(71) Applicant: Facebook Technologies, LLC, Menlo Park, CA (US)

(72) Inventors: Alexander Koshelev, Redmond, WA (US); Giuseppe Calafiore, Redmond, WA (US); Jacques Gollier, Sammamish, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 0 days.

(21) Appl. No.: 17/481,227

(22) Filed: Sep. 21, 2021

Related U.S. Application Data

(60) Provisional application No. 63/222,224, filed on Jul. 15, 2021.

(51) Int. Cl.
| | | |
|---|---|---|
| *F21V 8/00* | (2006.01) | |
| *G02B 6/12* | (2006.01) | |
| *G02B 6/124* | (2006.01) | |
| *G02B 6/125* | (2006.01) | |
| *G02B 6/28* | (2006.01) | |

(52) U.S. Cl.
CPC ........... *G02B 6/0036* (2013.01); *G02B 6/005* (2013.01)

(58) Field of Classification Search
CPC .......................... G02B 6/0036; G02B 6/2804
USPC ...................................................... 385/10, 14
See application file for complete search history.

(56) References Cited

U.S. PATENT DOCUMENTS

| | | |
|---|---|---|
| 5,911,018 A | 6/1999 | Bischel et al. |
| 6,201,913 B1 | 3/2001 | Yi et al. |
| 7,468,838 B2 | 12/2008 | Cha et al. |
| 10,613,410 B2 | 4/2020 | Hosseini et al. |
| 10,684,404 B2 | 6/2020 | Fattal |
| 2005/0089277 A1 | 4/2005 | Ishida |

(Continued)

FOREIGN PATENT DOCUMENTS

| | | |
|---|---|---|
| CN | 106405450 A | 2/2017 |
| EP | 3819688 A1 | 5/2021 |

(Continued)

OTHER PUBLICATIONS

Teng S., et al., "Uniform Theory of the Talbot Effect with Partially Coherent Light Illumination," Journal of the Optical Society of America. A, Optics, image science, and vision, Sep. 2003, vol. 20, No. 9, pp. 1747-1754.

(Continued)

*Primary Examiner* — Keith G. Delahoussaye
(74) *Attorney, Agent, or Firm* — Pequignot + Myers; Matthew A. Pequignot

(57) ABSTRACT

A waveguide illuminator includes adjacent linear and slab waveguide areas. An input light beam is guided in a linear waveguide, is split into a plurality of sub-beams to propagate in individual linear waveguides to a slab waveguide area and form an output light beam in the slab waveguide area. An array of out-couplers is disposed in the slab waveguide area. The array of out-couplers out-couples portions of the output light beam forms an array of out-coupled beam portions for illuminating a display panel. Locations of the array of out-couplers are coordinated with locations of individual pixels of the display panel, thereby improving efficiency of light utilization by the display panel.

20 Claims, 9 Drawing Sheets

(56) References Cited

U.S. PATENT DOCUMENTS

| | | |
|---|---|---|
| 2011/0274438 A1 | 11/2011 | Fiorentino et al. |
| 2013/0155477 A1 | 6/2013 | Yankov et al. |
| 2014/0314374 A1 | 10/2014 | Fattal et al. |
| 2017/0090096 A1 | 3/2017 | Fattal |
| 2017/0139110 A1 | 5/2017 | Woodgate et al. |
| 2017/0299793 A1 | 10/2017 | Fattal |
| 2018/0107091 A1 | 4/2018 | Hosseini et al. |
| 2018/0113419 A1 | 4/2018 | Stafford |
| 2018/0152680 A1 | 5/2018 | Zimmerman et al. |
| 2019/0155105 A1 | 5/2019 | Aieta et al. |
| 2020/0271850 A1 | 8/2020 | Vora et al. |
| 2022/0236486 A1* | 7/2022 | Muñoz Muñoz .... G02B 6/2804 |

FOREIGN PATENT DOCUMENTS

| | | |
|---|---|---|
| WO | 2020041067 A1 | 2/2020 |
| WO | 2022120250 A1 | 6/2022 |
| WO | 2022120253 A1 | 6/2022 |

OTHER PUBLICATIONS

International Search Report and Written Opinion for International Application No. PCT/US2022/036056, dated Sep. 8, 2022, 13 pages.

International Search report and Written Opinion for International Application No. PCT/US2022/036987, dated Oct. 19, 2022, 11 pages.

International Search Report and Written Opinion for International Application No. PCT/US2022/037357 dated Sep. 23, 2022, 11 pages.

International Search Report and Written Opinion for International Application No. PCT/US2022/036058, dated Nov. 9, 2022, 12 pages.

International Search report and Written Opinion for International Application No. PCT/US2022/037012, dated Nov. 15, 2022, 11 pages.

* cited by examiner

WAVEGUIDE ILLUMINATOR HAVING SLAB WAVEGUIDE PORTION

REFERENCE TO RELATED APPLICATION

This application claims priority from U.S. Provisional Patent Application No. 63/222,224 entitled "Single Mode Backlight Illuminator", filed on Jul. 15, 2021 and incorporated herein by reference in its entirety.

TECHNICAL FIELD

The present disclosure relates to illuminators, visual display devices, and related components and modules.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Consequently, head-mounted display devices can benefit from a compact and efficient configuration, including efficient light sources and illuminators providing illumination of a display panel, high-throughput ocular lenses and other optical elements in the image forming train.

BRIEF DESCRIPTION OF THE DRAWINGS

Exemplary embodiments will now be described in conjunction with the drawings, in which.

DETAILED DESCRIPTION

Figure 1:
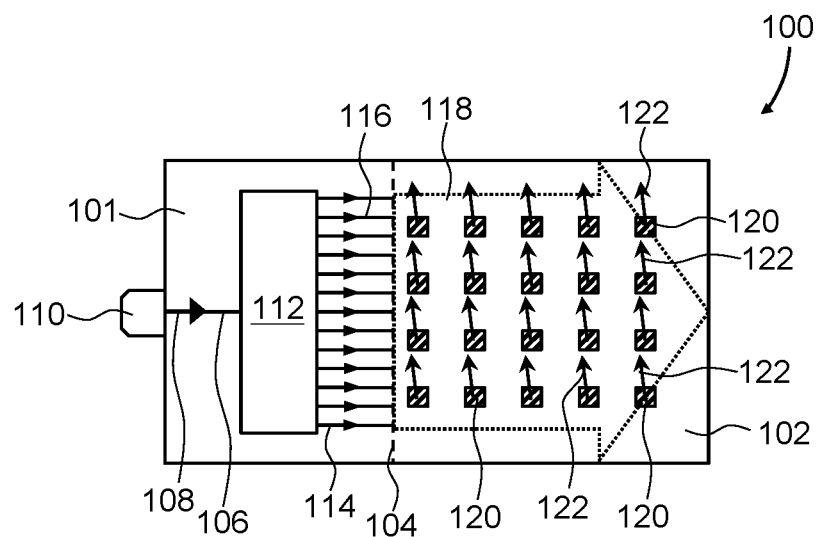
FIG. 1 is a schematic plan view of a waveguide illuminator of the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

In a visual display including an array of pixels coupled to an illuminator, the efficiency of light utilization depends on a ratio of a geometrical area occupied by pixels to a total area of the display panel. For miniature displays often used in near-eye and/or head-mounted displays, the ratio can be lower than 50%. The efficient backlight utilization can be further hindered by color filters on the display panel which on average transmit no more than 30% of incoming light. On top of that, there may exist a 50% polarization loss for polarization-based display panels such as liquid crystal (LC) display panels. All these factors considerably reduce the light utilization and overall wall plug efficiency of the display, which is undesirable.

In accordance with this disclosure, light utilization and wall plug efficiency of a backlit display may be improved by providing a waveguide illuminator including an array of out-couplers aligned with pixels of the display panel. In displays where the illuminator emits light of primary colors, e.g. red, green, and blue, the color of the illuminating light may be matched to the color filters, or the color filters omitted altogether. For polarization-based displays, the polarization of the emitted light may be matched to a pre-defined input polarization state. Matching the spatial distribution, transmission wavelength, and/or the transmitted polarization characteristics of the pixels of the display panel enables one to considerably improve the useful portion of display light that is not absorbed or reflected by the display panel on its way to the eyes of the viewer, and consequently to considerably improve the display's wall plug efficiency.

Singlemode or a few-mode waveguide in combination with laser illumination allows for efficient control of such light properties as color and directivity. As light propagates in a single spatial mode, the output can be diffraction-limited and highly directional. Single mode propagation also allows one to out-couple light in specific points on the waveguide and incorporate focusing pixels that can focus light into the pixels of a display panel while avoiding scattering in inter-pixel areas. The narrow spectrum of laser illumination enables large color gamut displays. Furthermore, single mode waveguides may preserve polarization, which results in highly polarized output from the backlight unit without the need of polarizer.

In accordance with the present disclosure, there is provided a waveguide illuminator comprising adjacent linear waveguide and slab waveguide areas. A first input waveguide is disposed in the linear waveguide area for guiding a first input light beam. A first splitter is coupled to the first input waveguide for splitting the first input light beam into a plurality of sub-beams. A first plurality of linear waveguides in the linear waveguide area is coupled to the first splitter for receiving and guiding the plurality of sub-beams split from the first input light beam to a boundary between the linear waveguide and slab waveguide areas for forming a first output light beam propagating in the slab waveguide area. A first array of out-couplers is disposed in the slab waveguide area. The out-couplers are spaced apart from one another and configured for out-coupling portions of the first output light beam to form a first array of out-coupled beam portions.

In some embodiments, each linear waveguide of the first plurality of linear waveguides includes a taper at the boundary between the linear waveguide and slab waveguide areas for expanding the sub-beams before coupling the sub-beams to the slab waveguide area. The first splitter may include a 1×2 splitter and a slab interference cavity. The 1×2 splitter is coupled to the first plurality of linear waveguides via the slab interference cavity. Ends of the linear waveguides of the first plurality of linear waveguides are disposed in areas of local interference maxima of the slab interference cavity.

In embodiments where the first input light beam comprises light of first, second, and third color channels, the waveguide illuminator may further include a volume Bragg grating (VBG) in an optical path of the first array of out-coupled beam portions. The VBG may be configured to redirect light of at least two of the first, second, and third color channels in the first out-coupled beam portions, such that the light of the first, second, and third color channels downstream of the VBG propagates substantially at a same chief ray angle.

The first array of out-couplers may include grating out-couplers for out-coupling the portions of the first output light beam to form the first array of out-coupled beam portions. The grating out-couplers may be chirped to focus the out-coupled beam portions; alternatively or in addition, the waveguide illuminator may include an array of microlenses coupled to the grating out-couplers to focus the out-coupled beam portions. The waveguide illuminator may further include an array of color-selective redirectors downstream of the grating out-couplers configured such that the light of the first, second, and third color channels downstream of the array of color-selective redirectors propagates substantially at a same chief ray angle. The array of color-selective redirectors may include e.g. an array of microprisms and/or an array of chirped gratings.

In multi-color illuminator embodiments, the first input light beam may carry light of a first color channel, and a second input light beam may carry light of a second color channel. The waveguide illuminator may further include a second input waveguide in the linear waveguide area, for guiding the second input light beam. A second splitter may be disposed in the linear waveguide area. The second splitter may be coupled to the second input waveguide for splitting the second input light beam into a plurality of sub-beams. A second plurality of linear waveguides may be disposed in the linear waveguide area. The second plurality of linear waveguides may be coupled to the second splitter for receiving and guiding the plurality of sub-beams split from the second input light beam to a boundary between the linear waveguide and slab waveguide areas for forming a second output light beam propagating in the slab waveguide area. A second array of out-couplers spaced apart from one another in the slab waveguide area may be provided for out-coupling portions of the second output light beam to form a second array of out-coupled beam portions.

In some embodiments, the slab waveguide area comprises first and second slab waveguide layers for guiding therein the first and second output light beams, respectively. The first and second pluralities of linear waveguides are coupled to the first and second slab waveguide layers respectively. The first and second arrays of out-couplers are disposed in the first and second slab waveguide layers respectively and configured to out-couple the portions of the first and second output light beams respectively at a substantially same chief ray angle.

In some embodiments, the slab waveguide area supports first and second transversal modes of propagation. The first and second pluralities of linear waveguides are configured to couple the respective pluralities of sub-beams into the first and second transversal modes respectively. The first and second arrays of out-couplers are configured to out-couple the portions of the first and second output light beams respectively at a substantially same chief ray angle.

In some embodiments, the slab waveguide area comprises a slab waveguide layer for propagating the first output light beam in the slab waveguide layer. The first array of out-couplers may include an array of prisms evanescently coupled to the slab waveguide layer for out-coupling the portions of the first output light beam out of the waveguide illuminator to form the first array of out-coupled beam portions.

In accordance with the present disclosure, there is provided a display device comprising a waveguide illuminator described herein, and a display panel comprising an array of display pixels disposed and configured to receive the array of the out-coupled beam portions. A pitch of the display pixels may be substantially equal to a pitch of the array of out-couplers.

The display device may further include a light source for providing the input light beam to the input waveguide. The light source may be a polarized light source, such that the input and output light beams and the array of out-coupled beam portions are polarized; the array of display pixels may include an array of tunable polarization rotators for tuning polarization of individual beam portions of the array of out-coupled beam portions. The light source may be a monochromatic light source, and the input light beam may have a wavelength of a first color channel.

In accordance with the present disclosure, there is further provided a method for illuminating a display panel. The method includes guiding a first input light beam in a first input linear waveguide of a waveguide illuminator, splitting the first input light beam into a plurality of sub-beams, guiding the plurality of sub-beams of the first input light beam in a first plurality of linear waveguides of the waveguide illuminator to a slab waveguide area of the waveguide illuminator, propagating the plurality of sub-beams of the first input light beam in the slab waveguide area to form a first output light beam propagating in the slab waveguide area, and out-coupling portions of the first output light beam to form a first array of out-coupled beam portions.

The method may further include expanding the plurality of sub-beams in waveguide tapers of the first plurality of linear waveguides before coupling the plurality of sub-beams to the slab waveguide area. The method may further include guiding a second input light beam in a second input linear waveguide of the waveguide illuminator, splitting the second input light beam into a plurality of sub-beams, guiding the plurality of sub-beams of the second input light beam in a second plurality of linear waveguides of the waveguide illuminator to a slab waveguide area of the waveguide illuminator, propagating the plurality of sub-beams of the second input light beam in the slab waveguide area to form a second output light beam propagating in the slab waveguide area, and out-coupling portions of the second output light beam to form a second array of out-coupled beam portions.

Referring now to FIG. 1, a waveguide illuminator 100 includes a linear waveguide area 101 and a slab waveguide area 102 disposed adjacent each other and sharing a common boundary 104. The linear waveguide area 101 includes linear waveguide structures, and the slab waveguide area includes slab waveguide structures. Herein, the term "linear waveguide" or "linear waveguide structure" denotes a waveguide that bounds the light propagation in two dimensions, like a light wire. A linear waveguide may be straight, curved, etc. In other words, the term "linear" does not mean a straight waveguide section. One example of a linear waveguide is a ridge-type waveguide. The term "slab waveguide" or "slab waveguide structure" denotes a waveguide that bounds the light propagation in one dimension, typically a vertical dimension, i.e. across the thickness of the waveguide chip. The light can freely propagate in plane of the waveguide chip. In both cases, the waveguides may be singlemode or a few-mode waveguides, e.g. less than 12 transversal modes of propagation.

An input waveguide 106 is disposed in the linear waveguide area 101 of the waveguide illuminator 100. The input waveguide 106 guides a light beam 108 illustrated with an arrow. The light beam 108 may be emitted e.g. by a light source 110. A splitter 112 is coupled to the input waveguide 106 for splitting the input light beam 108 into a plurality of sub-beams 114 illustrated with arrows. A plurality of linear waveguides 116 is disposed in the linear waveguide area 101. The linear waveguides 116 are coupled to the splitter 112 for guiding the plurality of sub-beams 114 split from the input light beam 108 to the boundary 104 between the linear waveguide 101 and slab waveguide 102 areas, forming an output light beam 118 propagating in the slab waveguide area 102. The output light beam 118 is illustrated with a large arrow having dashed border. A direction of propagation of the output beam 118 depends on the phase relationship between the sub-beams 114. For the in-phase sub-beams 114, as is typically the case, the output beam 118 propagates perpendicular to the boundary 104, i.e. horizontally left to right in FIG. 1. The output beam 118 may expand somewhat in plane of the slab area 102 due to diffraction.

An array of out-couplers 120 is disposed in the slab waveguide area 102. The out-couplers 120, e.g. grating or evanescent out-couplers, are spaced apart from one another in the slab waveguide area 102. In operation, the out-couplers 120 out-couple portions 122 of the first output light beam to form a first array of out-coupled beam portions 122. The disposition of the out-couplers 120 may be correlated with the disposition of pixels of a display panel being illuminated, to make sure that the portions 122 mostly propagate through the pixels of the display panel and are not blocked or scattered in inter-pixel areas of the display panel, which increases the amount of light transmitted through the display panel, i.e. improves light utilization.

Figure 2:
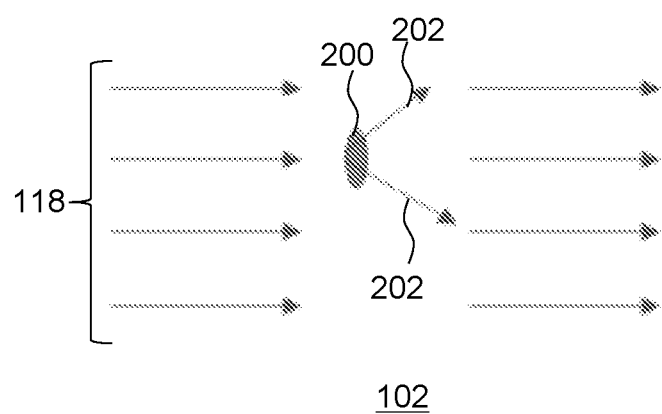
FIG. 2 is a plan view of a slab waveguide area of the waveguide illuminator of FIG. 1 showing light scattering by a defect in the slab waveguide area.

An advantage of a slab waveguide illuminator, as compared with an illuminator having arrays of linear waveguides with grating out-couplers along the linear waveguides, is an increased level of tolerance to manufacturing defects that may cause scattering and associated interference effects. Referring to FIG. 2 for an illustration, the output light beam 118 propagates in the slab waveguide area 102 encounters a particle defect 200. A portion of the output light beam 118 will scatter as shown with arrows 202, which could create speckles in the output light beam pattern, if not for the effect of diffraction filling the shadow left by the particle defect 200 in the direction of propagation in plane of the slab waveguide area 102. Thus, light propagating in the slab waveguide area 102 is less prone to scattering caused by manufacturing imperfections than light carried by an array of linear illuminating waveguides equipped with grating out-couplers along their length.

Figure 3:
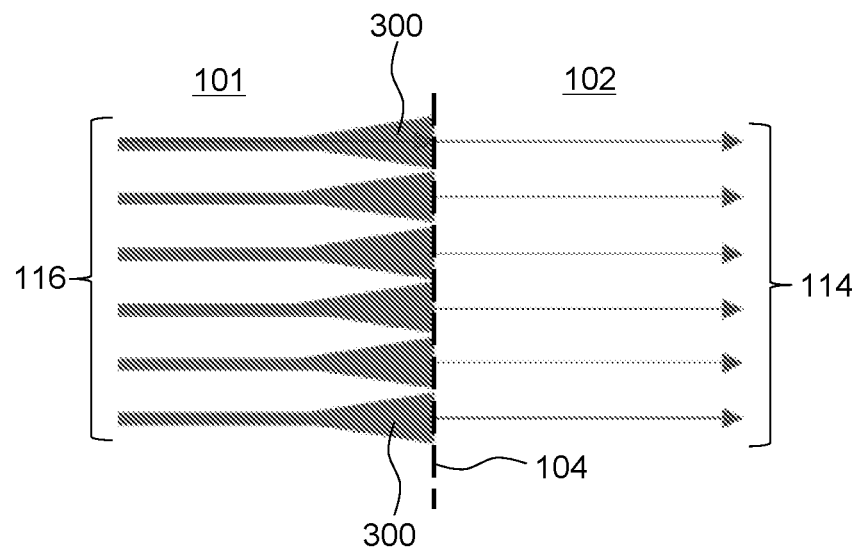
FIG. 3 is a schematic plan view of an array of adiabatic tapers of the waveguide illuminator of claim 1.

Referring to FIG. 3 with further reference to FIG. 1, each linear waveguide 116 of the waveguide illuminator 100 may include a taper 300, e.g. adiabatic taper, at the boundary 104 between the linear waveguide 101 and the slab waveguide 102 areas The purpose of the tapers 300 is to expand the corresponding sub-beams 114 before coupling the sub-beams 114 to the slab waveguide area 102. The sub-beams 114 expanded by the tapers 300 fill the slab waveguide area 102 more uniformly, resulting in a better directivity and uniformity of the output light beam 118 propagating in the slab area 102 shown in FIG. 1.

Figure 4:
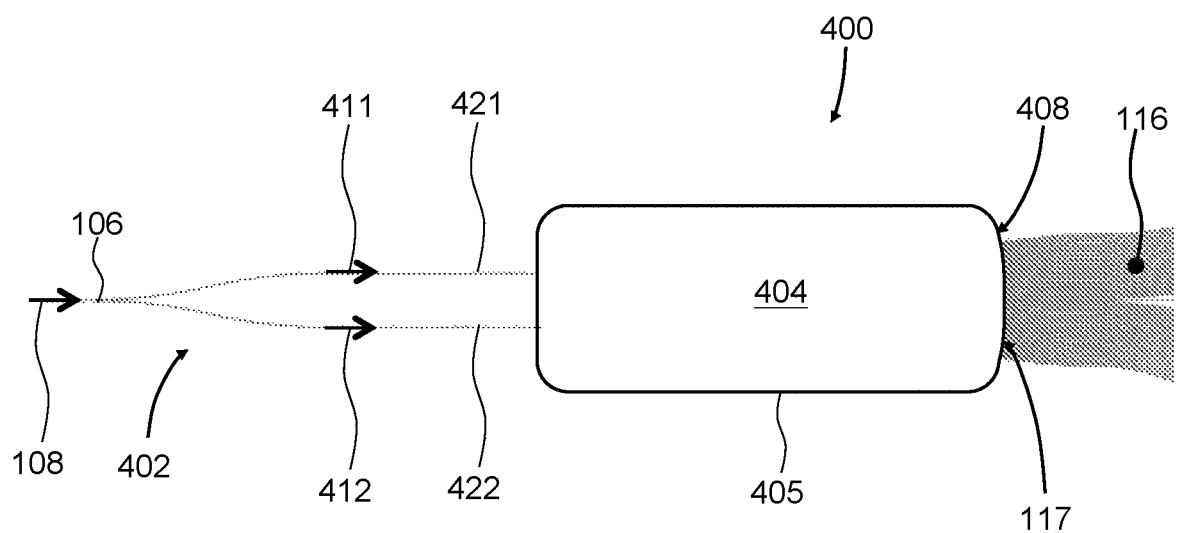
FIG. 4 is a plan view of a splitter embodiment of the waveguide illuminator of claim 1.

The function of the splitter 112 of FIG. 1 is to split the input light beam 108 into the sub-beams 114. Many configurations for the splitter 112 are possible, for example a binary tree of 1×2 splitters or evanescent 2×2 couplers, a multimode interference (MMI) splitter, etc. Referring for a non-limiting example to FIG. 4, a splitter component 400 includes a 1×2 waveguide splitter 402 coupled to the plurality of linear waveguides 116 via a slab interference cavity 404, which is a section of a slab waveguide having a perimeter 405. In operation, the 1×2 splitter 402 splits the input light beam 108 into two portions 411, 412 of a substantially equal optical power. The portions 411, 412 propagate to the slab interference cavity 404 in linear waveguides 421, 422. The portions 411, 412 expand in the slab interference cavity 404, undergoing optical interference at an opposite side 408 of the slab interference cavity 404. Ends 117 of the linear waveguides 116 are disposed in areas of local interference maxima of the side 408 of the slab interference cavity 404. Areas of local interference minima are disposed between the ends 117 of the linear waveguides 116, such that optical power of the input light beam 108 is not lost between the ends 117 of the linear waveguides 116.

Figure 5:
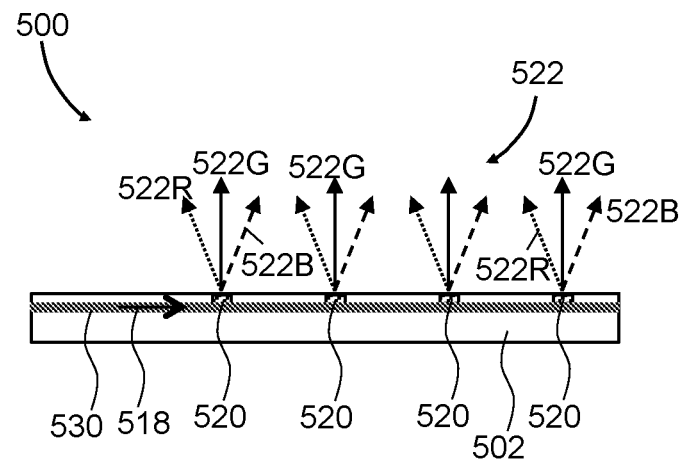
FIG. 5 is a side cross-sectional view of grating out-couplers in a slab area of the waveguide illuminator of FIG. 1.

Referring back to FIG. 1, the slab waveguide area 102 is equipped with spaced apart out-couplers 120 for out-coupling the portions 122 of the output light beam 118. The out-couplers 120 may be based on diffraction gratings that diffract the portions 122 of the output light beam 118 from the slab area 102. The diffraction angle of the portions 122 depends on wavelength and, therefore, will be generally different for light of different color channels. This may be problematic in applications where the waveguide illuminator 100 is used as a source of light for backlighting or front-lighting a color display. Referring to FIG. 5 as an illustration, a waveguide illuminator 500 is an embodiment of the waveguide illuminator 100 of FIG. 1. The waveguide illuminator 500 includes grating out-couplers 520 spaced apart from one another and coupled to a slab core 530 of a slab waveguide area 502 for out-coupling portions 522 of an output light beam 518. In the waveguide illuminator 500, the output light beam 518 includes light of three color channels: a red light beam 522R, a green light beam 522G, and a blue light beam 522B. The red 518R, green 518G, and blue 518B light beams are out-coupled at different chief ray (central ray) angles. The chief rays of the red light beams 522R are shown with dotted arrows, the chief rays of green light 522G are shown in solid arrows, and the chief rays of blue light 522B are shown with dashed arrows. It is seen from FIG. 5 that the out-coupled light portions 522 are angularly dispersed by wavelength. Yet, in applications where it is desirable that the out-coupled light portions are not wavelength-dispersed, light of all colors needs to be out-coupled at the same chief ray angle, such that the light sub-beams of different colors co-propagate in a same direction.

Figure 6:
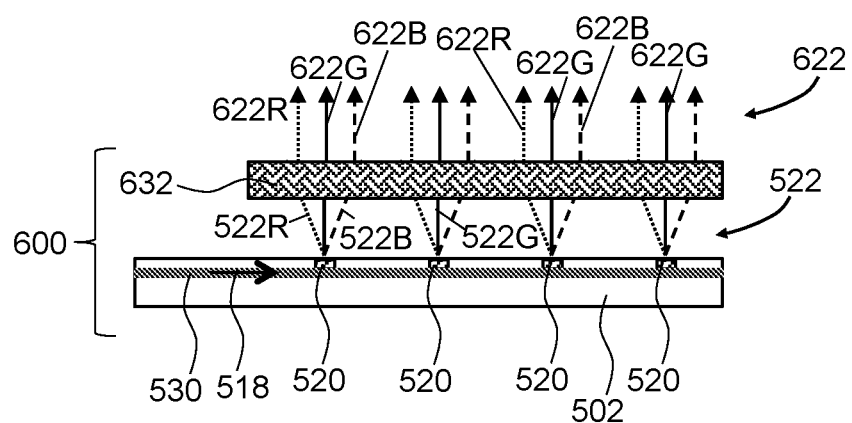
FIG. 6 is a side cross-sectional view of a waveguide illuminator embodiment including a volume Bragg grating (VBG) for compensation dispersion of the emitted light by the grating out-couplers of FIG. 5.

Referring to FIG. 6, a waveguide illuminator 600 is an embodiment of the waveguide illuminator 500 of FIG. 5, includes similar elements, and operates with a multi-wavelength light source emitting the light of first, second, and third color channels e.g. the red light beam 522R, the green light beam 522G, and the blue light beam 522B. To compensate for wavelength dispersion, the waveguide illuminator 600 includes a volume Bragg grating (VBG) 632 in an optical path of the array of out-coupled beam portions 522 including the red light beam 522R, the green light beam 522G, and the blue light beam 522B. VBGs can be configured to redirect light in a wavelength-selective manner. Accordingly, the VBG 632 may be configured to redirect light of at least two of the first, second, and third color channels in the out-coupled beam portions 522, such that the light of the first, second, and third color channels downstream of the VBG propagates substantially at a same chief ray angle. For example, the VBG 632 may be configured to not redirect the green light 522G while the red light 522R and blue light 522B is redirected, causing output red light beam 622R, output green light beam 622G, and output blue light beam 622B of output light 622 to have substantially parallel chief rays, as illustrated in FIG. 6.

Figure 7:
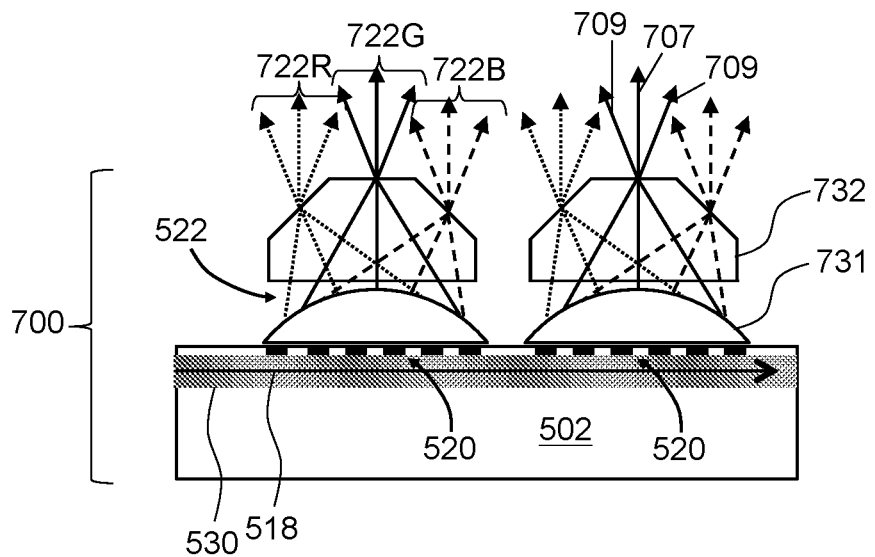
FIG. 7 is a side cross-sectional view of a waveguide illuminator embodiment including a lens-prism combination for compensation dispersion of the emitted light by the grating out-couplers of FIG. 5.

In some embodiments of a waveguide illuminator, the out-coupled beam portions are re-focused to provide a desired beam divergence characteristics. Referring for instance to FIG. 7, a waveguide illuminator 700 is an embodiment of the waveguide illuminator 500 of FIG. 5, includes similar elements, and operates with a multi-wavelength light source, not shown, emitting the light of first, second, and third color channels, specifically the red light beam 522R, the green light beam 522G, and the blue light beam 522B. The waveguide illuminator 700 further includes an array of microlenses 731 coupled to the grating out-couplers 520. In FIG. 7, two such microlenses 731 and two such grating out-couplers 520 are shown, with individual grating lines represented by black squares. The microlenses 731 may be configured to focus the out-coupled beam portions 522R, 522G, and 522B. An array of microprisms 732 is disposed downstream of the grating out-couplers 520 configured such that the red 722R, green 722G, and blue 722B light beams downstream of the array of microprisms 732 propagates substantially at a same chief ray angle. In FIG. 7, the red light 722R rays are shown with dotted arrows, the green light 722G rays are shown with solid arrows, and the blue light 722B rays are shown with dashed arrows. Three such rays are shown for light of each color channel, including a chief ray 707 and two marginal rays 709. The microprisms 732 (two are illustrated in FIG. 7) function as redirectors that perform function of making the chief rays 707 of all color channels parallel, similar to the VBG 632 of FIG. 6. Other types of color- or wavelength-selective redirectors may be used, e.g. grating-based color-selective redirectors. An array of chirped gratings that combine the focusing function of the microlenses 731 and beam redirecting function of the microprisms 732 may also be used. Furthermore, the grating out-couplers may also be chirped to focus the out-coupled beam portions.

Figure 8:
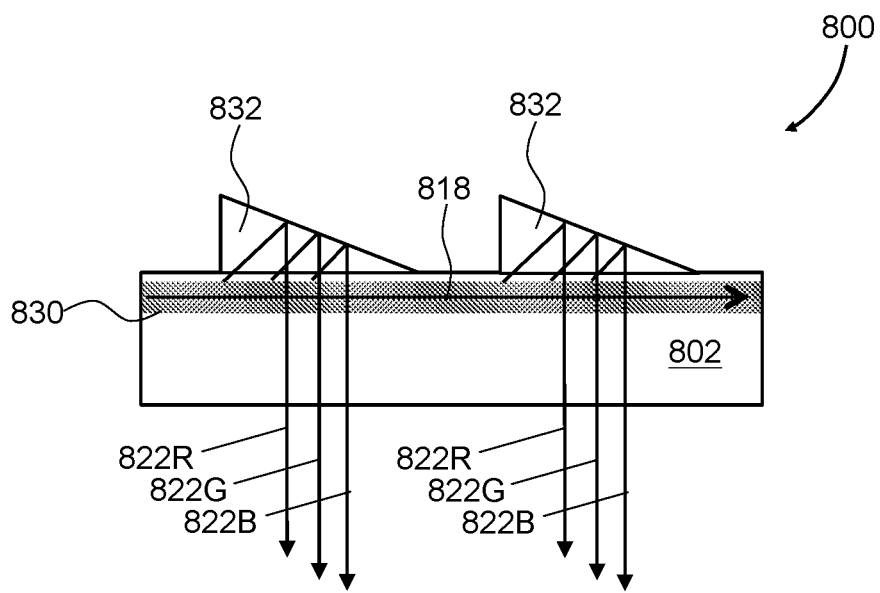
FIG. 8 is a side cross-sectional view of evanescent prismatic out-couplers usable in the waveguide illuminator of claim 1.

Turning to FIG. 8, a waveguide illuminator 800 is an embodiment of the waveguide illuminator 100 of FIG. 1, includes similar elements, and operates with a multi-wavelength light source, not shown, emitting the light of first, second, and third color channels, specifically the red light beam 822R, the green light beam 822G, and the blue light beam 822B components combined into an output light beam 818. The waveguide illuminator 800 of FIG. 8 includes an array of prisms 832 evanescently coupled to a slab waveguide layer 830 of a slab waveguide portion 802. The prisms 832 perform the function of the out-couplers 120 of the waveguide illuminator 100 of FIG. 1. The prisms 832 of the waveguide illuminator 800 of FIG. 8 evanescently out-couple the portions of the red light beam 822R, the green light beam 822G, and the blue light beam 822B components of the output light beam 818 from the waveguide illuminator 800 by first out-coupling at an acute angle into the prisms 832 and then reflecting from top faces of the prisms 832 downwards in FIG. 8, e.g. by total internal reflection or TIR, to form the array of out-coupled beam portions of different color channels. Since the direction of evanescent out-coupling is much less sensitive to the wavelength of the out-coupled light as compared to the case of grating out-couplers, portions of the red light beam 822R, the green light beam 822G, and the blue light beam 822B components exit the waveguide illuminator 800 substantially parallel to one another.

In some embodiments, a waveguide illuminator may include multiple structures of FIG. 1, one per each color channel. Light of different color channels carried by different input light beams may be coupled into individual input linear waveguides. For example, for a second color channel, a second input waveguide may be provided in the linear waveguide area 101 for guiding a second input light beam carrying light of a second color channel. A second splitter may be provided in the linear waveguide area 101. The second splitter may be coupled to the second input waveguide for splitting the second input light beam into a plurality of sub-beams; a second plurality of linear waveguides may be provided in the linear waveguide area 101. The linear waveguides of the second plurality may be coupled to the second splitter for receiving and guiding the plurality of sub-beams split from the second input light beam to a boundary between the linear waveguide and slab waveguide areas for forming a second output light beam propagating in the slab waveguide area. In a similar manner, a second array of out-couplers may be spaced apart from one another in the slab waveguide area 102 for out-coupling portions of the second output light beam to form a second array of out-coupled beam portions.

Figure 9:
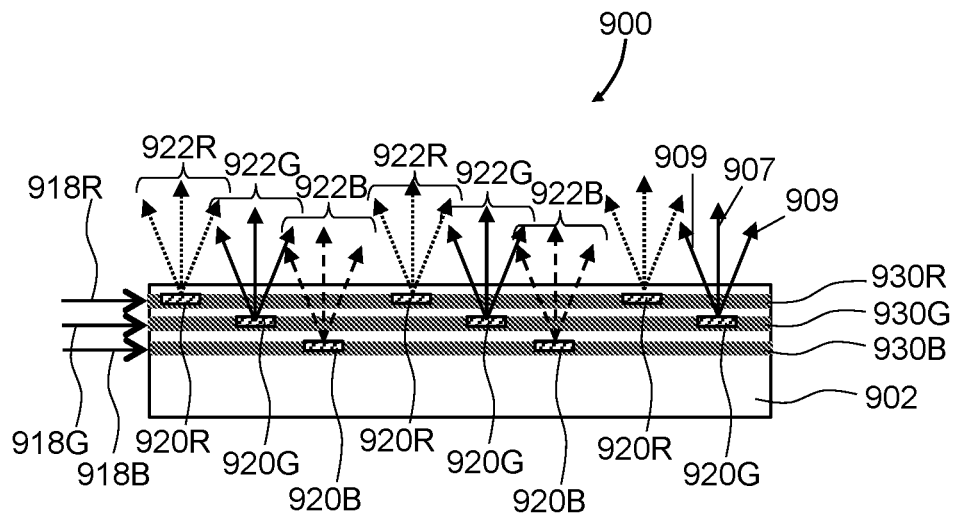
FIG. 9 is a side cross-sectional view of an embodiment of the waveguide illuminator of claim 1 having a multi-layer slab waveguide area.

A non-limiting illustrative example of such a multi-channel waveguide illuminator 900 is presented in FIG. 9. A slab waveguide area 902 of the multi-channel waveguide illuminator 900 includes one slab waveguide layer per color channel, in this example three singlemode slab waveguide layers 930R, 930G, and 930B for propagating red 918R, green 918G, and blue 918B output light beams respectively. The singlemode slab waveguide layers 930R, 930G, and 930B are coupled respective arrays of linear waveguides, not shown for brevity. At least two slab waveguide layers, for two color channels, may be provided in two-color systems.

Still referring to FIG. 9, arrays of red 920R, green 920G, and blue 920B out-couplers, e.g. grating-based out-couplers, are disposed in the first and second slab areas respectively and configured to out-couple the portions 922R, 922G, and 922B of the red 918R, green 918G, and blue 918B output light beams respectively. Since light of different color channels propagates in different slab waveguide layers 930R, 930G, and 930B and is out-coupled by different out-couplers 920R, 920G and 920B, the latter may be configured to out-couple the beam portions 922R, 922G, and 922B substantially at a same chief ray 907 angle and, optionally, at a same cone angle between marginal rays 909.

Figure 10:
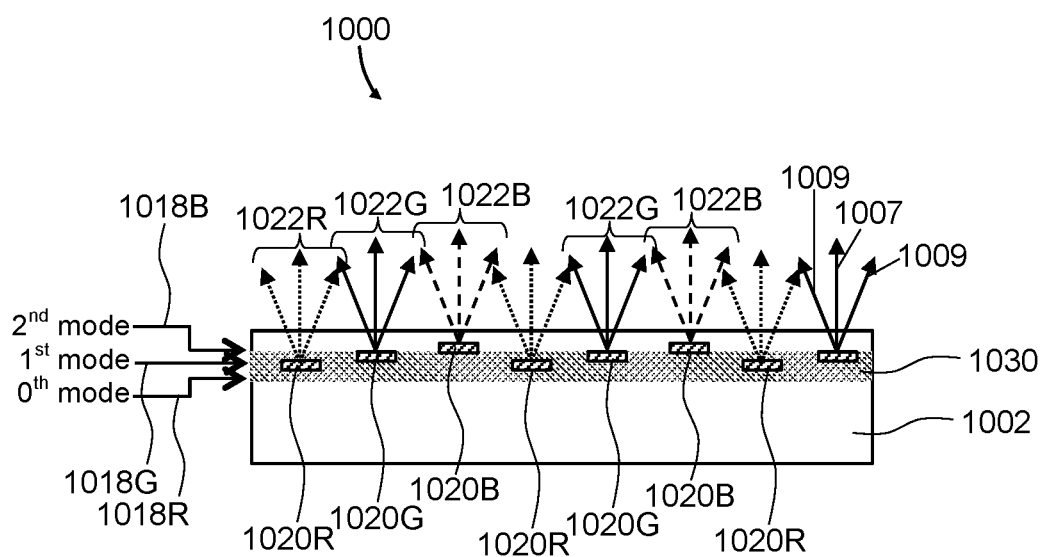
FIG. 10 is a side cross-sectional view of an embodiment of the waveguide illuminator of FIG. 1 having a few-mode slab waveguide area.

Turning to FIG. 10, a slab waveguide area 1002 of a waveguide illuminator 1000 includes a few-mode slab waveguide layer 1030 that can guide several transversal modes of propagation, in this example $0^{th}$, $1^{st}$, and $2^{nd}$ transversal modes. Pluralities of linear waveguides, not shown for brevity, are configured to couple the respective pluralities of sub-beams of different color channels into different transversal modes of propagation of the few-mode slab waveguide layer 1030 to propagate as red 1018R, green 1018G, and blue 1018B output light beams. Specifically, the red output light beam 1018R may propagate in the $0^{th}$ transversal mode of propagation, the green output light beam 1018G may propagate in the $1^{st}$ transversal mode of propagation, and the blue output light beam 1018B may propagate in the $2^{nd}$ transversal mode of propagation. Corresponding out-couplers 1020R, 1020G, and 1020B are configured to out-couple portions 1022R, 1022G, and 1022B of the as red 1018R, green 1018G, and blue 1018B output light beams respectively, from the $0^{th}$, $1^{st}$ and $2^{nd}$ transversal modes of propagation. To that end, the out-couplers 1020R, 1020G, and 1020B may be disposed at different depth levels in the few-mode core layer 1030, as illustrated in FIG. 10. Since light of different color channels propagates in different transversal modes of propagation and is out-coupled by different out-couplers 1020R, 1020G and 1020B, the latter may be configured to out-couple the beam portions 1022R, 1022G, and 1022B substantially at a same chief ray 1007 angle and, optionally, at a same cone angle between marginal rays 1009.

Figure 11:
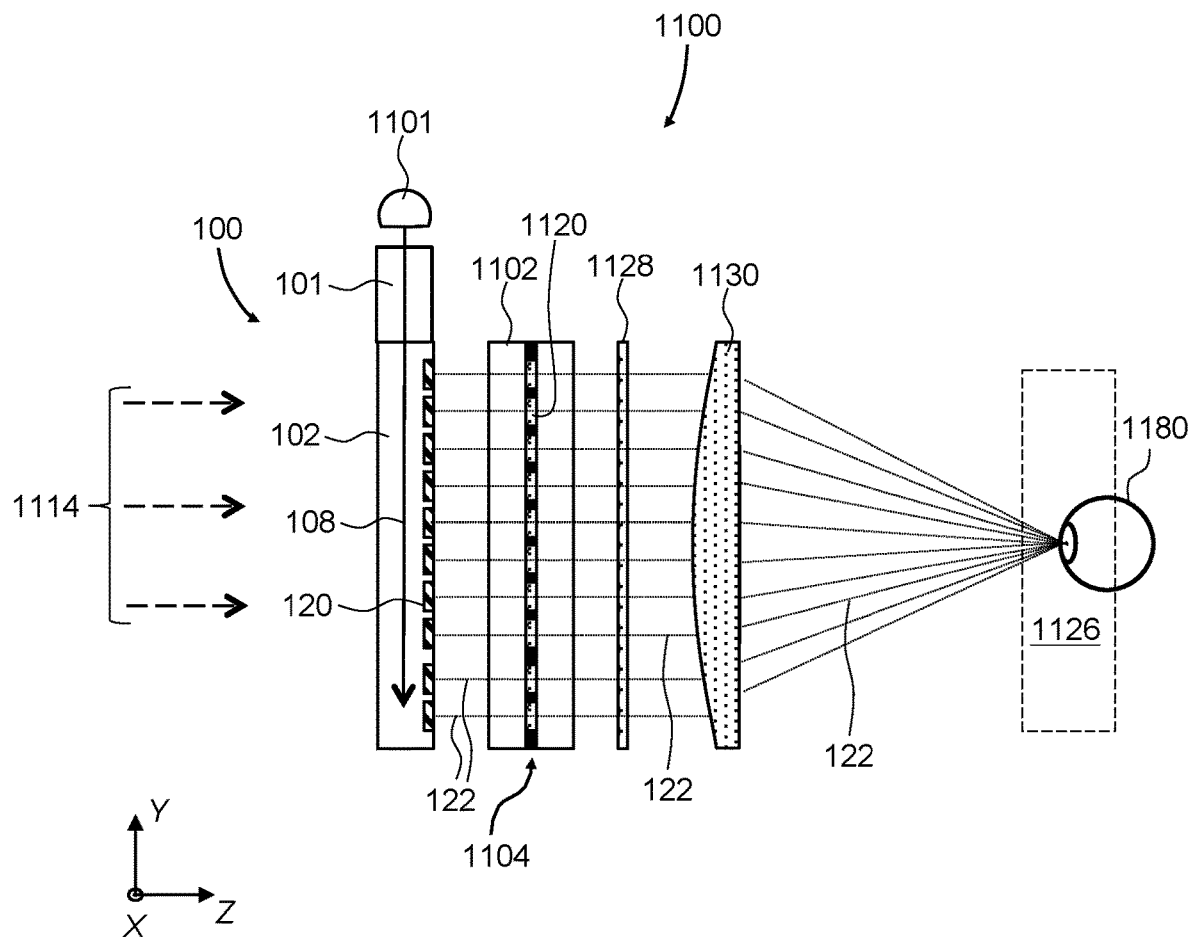
FIG. 11 is a schematic view of a near-eye display using the waveguide illuminator of FIG. 1.

Referring now to FIG. 11, a display device 1100 includes the waveguide illuminator 100 coupled to a display panel 1102. A light source 1101, e.g. a monochromatic light source at a wavelength of a color channel, may be optically coupled to the illuminator 100 for providing the light beam 108 to the illuminator 100. The display panel 1102 includes an array of display pixels 1120 disposed and configured to receive the array of the out-coupled beam portions 122 from the illuminator 100. To ensure that the beam portions 122 are used efficiently, locations and pitch of the display pixels 1120 may be matched to locations and pitch of the array of out-couplers 120, in both X- and Y-directions.

The display panel 1102 may include a liquid crystal (LC) layer 1104, with the display pixels 1120 configured to controllably convert or tune a polarization state of the individual beam portions 122, e.g. rotate a linear polarization state. In this embodiment, the light source 1101 may be a polarized light source emitting linearly polarized light. A linear polarizer 1128 may be provided to convert the polarization distribution of the beam portions 122 imparted by the display pixels 1120 into an optical power density distribution representing an image to be displayed. The image is in linear domain, where pixel coordinates of the image being displayed correspond to XY coordinates of the display pixels 1120.

An ocular lens 1130 may be used to convert the image in linear domain into an image in angular domain at an eyebox 1126 for direct observation by an eye 1180. Herein, the term "image in angular domain" refers to an image where pixel coordinates of the image being displayed correspond to ray angles of the beam portions 122. In embodiments with tunable polarization rotators, the light source 1101 may emit polarized light, and the waveguide illuminator 100 may preserve that state of polarization. It is further noted that any of the waveguide illuminators disclosed herein may be used instead of the waveguide illuminator 100 of the display device 1100. The waveguide illuminator 100 may be made transparent to external light 1114.

Figure 12:
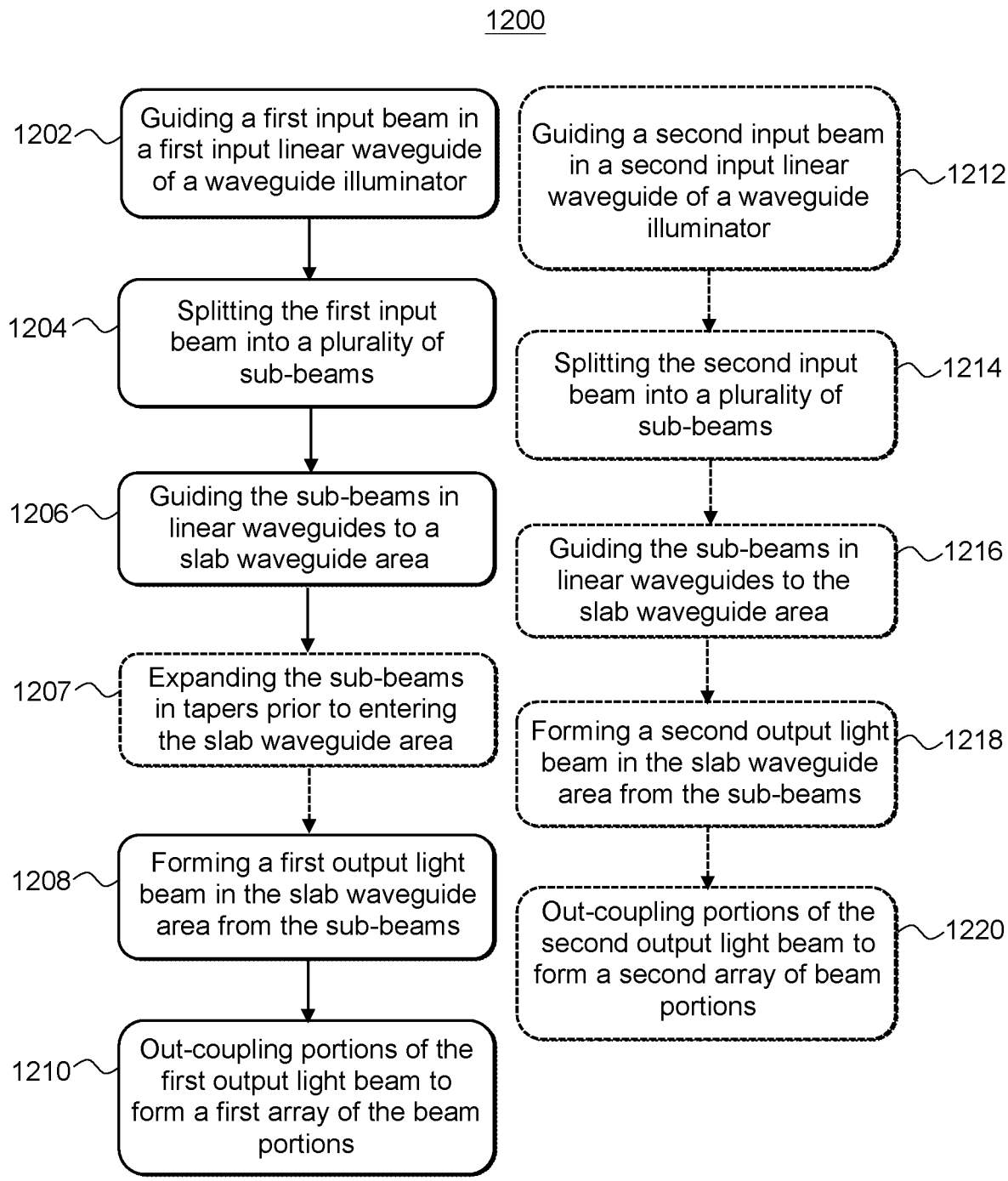
FIG. 12 is a flow chart of a method for illuminating a display panel in accordance with the present disclosure.

Referring to FIG. 12 with further reference to FIG. 1, a method 1200 for illuminating a display panel includes guiding (1202) a first input light beam, e.g. the light beam 108 (FIG. 1), in a first input linear waveguide, e.g. the input linear waveguide 106, of a waveguide illuminator, e.g. the waveguide illuminator 100 of FIG. 1. The first input light beam is split (FIG. 12; 1204) into a plurality of the sub-beams 114. The plurality of sub-beams 114 of the first input light beam 108 is guided (1206) in the plurality of linear waveguides 116 of the waveguide illuminator 100 to a slab waveguide area 102 of the waveguide illuminator 100. The plurality of sub-beams 114 is propagated (1208) in the slab waveguide area 102 to form a first output light beam, e.g. the output light beam 118, propagating in the slab waveguide area 102. Portions of the first output light beam are out-coupled (1210) to form a first array of out-coupled beam portions, i.e. the beam portions 122 in FIG. 1. The plurality of sub-beams may be expanded (1207) in tapers e.g. the tapers 300 of FIG. 3, of the plurality of linear waveguides 116 before coupling the plurality of sub-beams 114 to the slab waveguide area 102.

In embodiments where the illuminating light includes a plurality of color channels, the method 1200 may be performed for each color channel. For instance, the method 1200 may further include guiding (1212) a second input light beam of a second color channel in a second input linear waveguide of the waveguide illuminator; splitting (1214) the second input light beam into a plurality of sub-beams; guiding (1216) the plurality of sub-beams of the second input light beam in a second plurality of linear waveguides of the waveguide illuminator to a slab waveguide area of the waveguide illuminator; propagating (1218) the plurality of sub-beams of the second input light beam in the slab waveguide area to form a second output light beam propagating in the slab waveguide area; and out-coupling (1220) portions of the second output light beam to form a second array of out-coupled beam portions. The linear waveguide structures may be disposed in the linear waveguide area 101 of the waveguide illuminator 100. The method 1200 may be performed with any of the waveguide illuminators considered herein.

Figure 13:
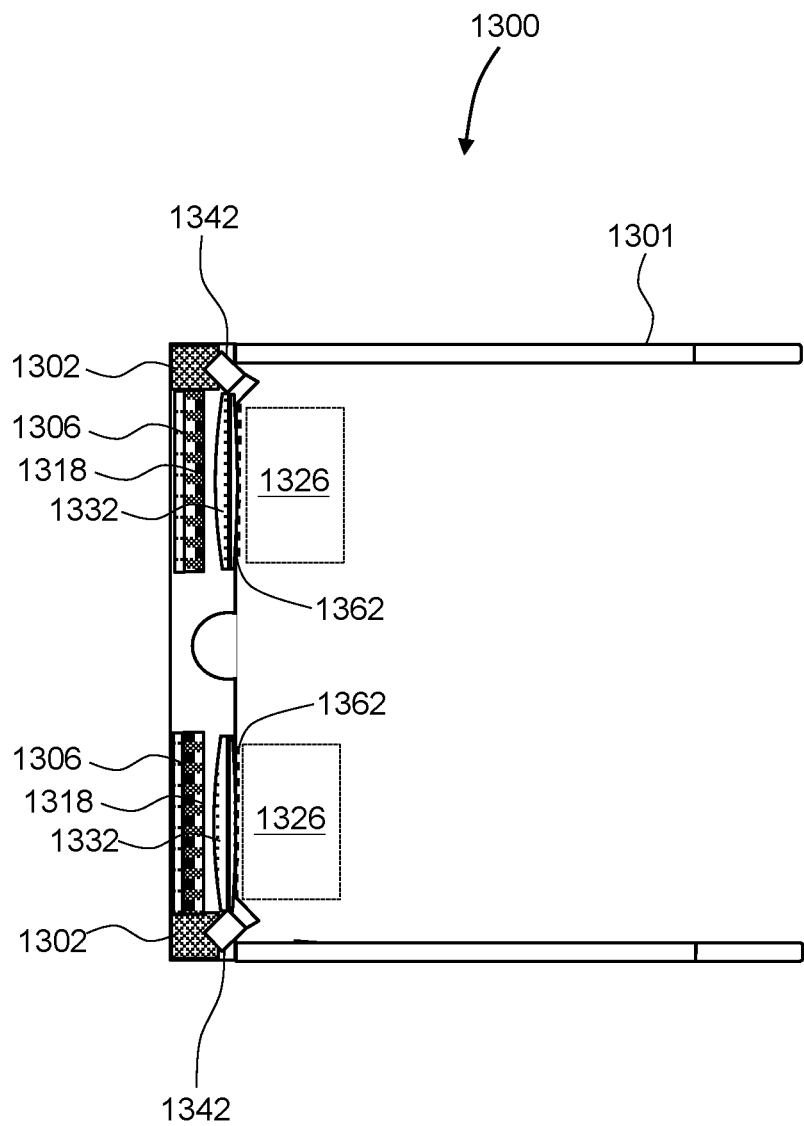
FIG. 13 is a view of an augmented reality (AR) display of this disclosure having a form factor of a pair of eyeglasses.

Turning to FIG. 13, a virtual reality (VR) near-eye display 1300 includes a frame 1301 supporting, for each eye: a light source 1302; a waveguide illuminator 1306 operatively coupled to the light source 1302 and including any of the waveguide illuminators disclosed herein; a display panel 1318 including an array of display pixels, where positions of the out-coupling gratings in the waveguide illuminator 1306 are coordinated with positions of the polarization-tuning pixels of the display panel 1318; and an ocular lens 1332 for converting the image in linear domain generated by the display panel 1318 into an image in angular domain for direct observation at an eyebox 1326. A plurality of eyebox illuminators 1362 (shown as black dots) may be placed onto the side of the waveguide illuminator 1306 that faces the eyebox 1326. An eye-tracking camera 1342 may be provided for each eyebox 1326.

The purpose of the eye-tracking cameras 1342 is to determine position and/or orientation of both eyes of the user. The eyebox illuminators 1362 illuminate the eyes at the corresponding eyeboxes 1336, allowing the eye-tracking cameras 1342 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1362, the latter may be made to emit light invisible to the user. For example, infrared light may be used to illuminate the eyeboxes 1336.

Figure 14:
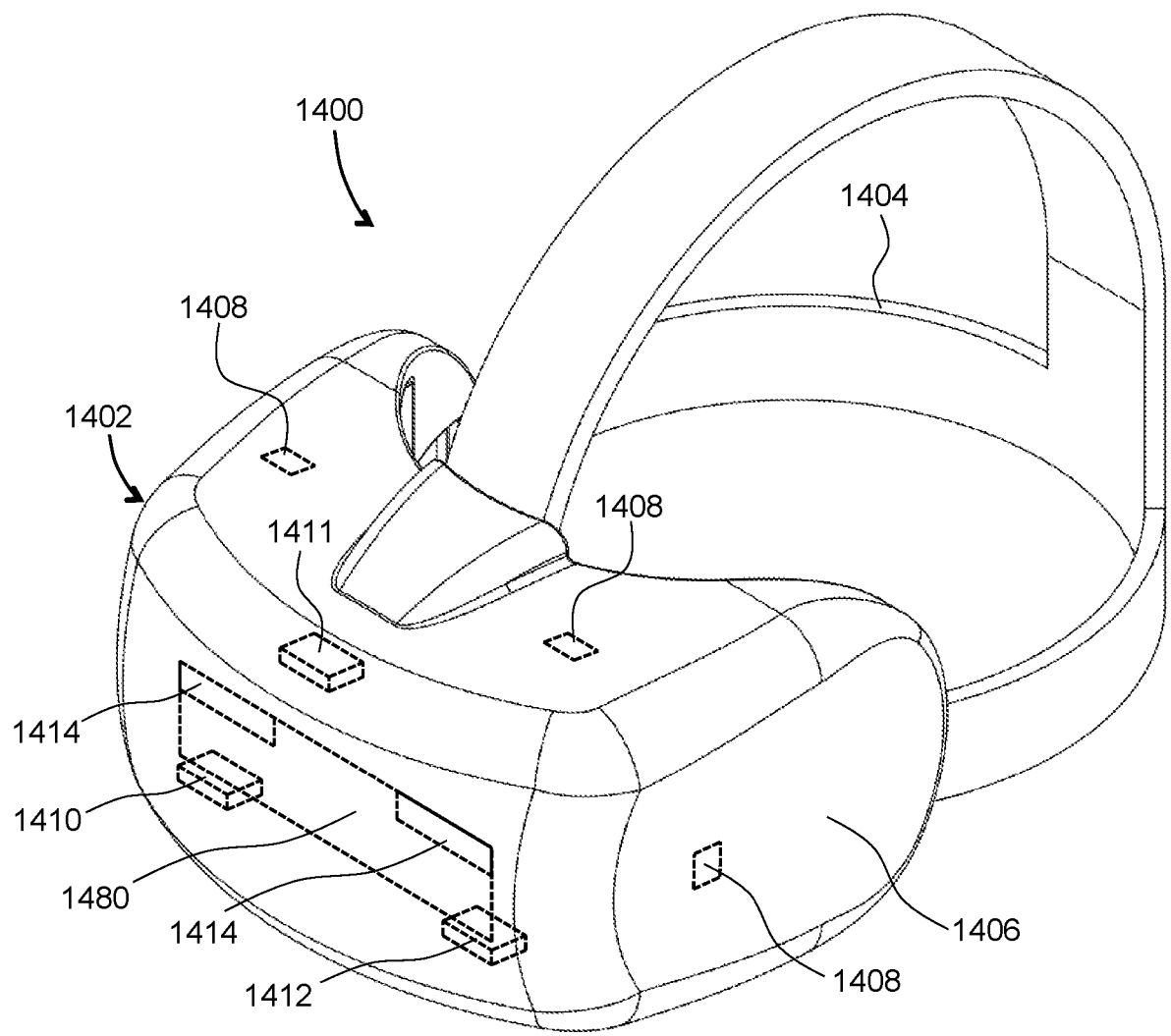
FIG. 14 is a three-dimensional view of a head-mounted display (HMD) of this disclosure.

Referring now to FIG. 14, an HMD 1400 is an example of an AR/VR wearable display system which encloses the user's face, for a greater degree of immersion into the AR/VR environment. The HMD 1400 may generate the entirely virtual 3D imagery. The HMD 1400 may include a front body 1402 and a band 1404 that can be secured around the user's head. The front body 1402 is configured for placement in front of eyes of a user in a reliable and comfortable manner. A display system 1480 may be disposed in the front body 1402 for presenting AR/VR imagery to the user. The display system 1480 may include any of the display devices and illuminators disclosed herein. Sides 1406 of the front body 1402 may be opaque or transparent.

In some embodiments, the front body 1402 includes locators 1408 and an inertial measurement unit (IMU) 1410 for tracking acceleration of the HMD 1400, and position sensors 1412 for tracking position of the HMD 1400. The IMU 1410 is an electronic device that generates data indicating a position of the HMD 1400 based on measurement signals received from one or more of position sensors 1412, which generate one or more measurement signals in response to motion of the HMD 1400. Examples of position sensors 1412 include: one or more accelerometers, one or more gyroscopes, one or more magnetometers, another suitable type of sensor that detects motion, a type of sensor used for error correction of the IMU 1410, or some combination thereof. The position sensors 1412 may be located external to the IMU 1410, internal to the IMU 1410, or some combination thereof.

The locators 1408 are traced by an external imaging device of a virtual reality system, such that the virtual reality system can track the location and orientation of the entire HMD 1400. Information generated by the IMU 1410 and the position sensors 1412 may be compared with the position and orientation obtained by tracking the locators 1408, for improved tracking accuracy of position and orientation of the HMD 1400. Accurate position and orientation is important for presenting appropriate virtual scenery to the user as the latter moves and turns in 3D space.

The HMD 1400 may further include a depth camera assembly (DCA) 1411, which captures data describing depth information of a local area surrounding some or all of the HMD 1400. The depth information may be compared with the information from the IMU 1410, for better accuracy of determination of position and orientation of the HMD 1400 in 3D space.

The HMD 1400 may further include an eye tracking system 1414 for determining orientation and position of user's eyes in real time. The obtained position and orientation of the eyes also allows the HMD 1400 to determine the gaze direction of the user and to adjust the image generated by the display system 1480 accordingly. The determined gaze direction and vergence angle may be used to adjust the display system 1480 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1402.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer.

Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclo-

What is claimed is:

1. A waveguide illuminator comprising:
   adjacent linear waveguide and slab waveguide areas;
   a first input waveguide in the linear waveguide area, for guiding a first input light beam;
   a first splitter coupled to the first input waveguide for splitting the first input light beam into a plurality of sub-beams;
   a first plurality of linear waveguides in the linear waveguide area, coupled to the first splitter for receiving and guiding the plurality of sub-beams split from the first input light beam to a boundary between the linear waveguide and slab waveguide areas for forming a first output light beam propagating in the slab waveguide area; and
   a first array of out-couplers spaced apart from one another in the slab waveguide area for out-coupling portions of the first output light beam to form a first array of out-coupled beam portions.

2. The waveguide illuminator of claim 1, wherein each linear waveguide of the first plurality of linear waveguides includes a taper at the boundary between the linear waveguide and slab waveguide areas for expanding the sub-beams before coupling the sub-beams to the slab waveguide area.

3. The waveguide illuminator of claim 1, wherein the first splitter comprises a 1×2 splitter and a slab interference cavity, wherein the 1×2 splitter is coupled to the first plurality of linear waveguides via the slab interference cavity, wherein ends of the linear waveguides of the first plurality of linear waveguides are disposed in areas of local interference maxima of the slab interference cavity.

4. The waveguide illuminator of claim 1, wherein the first array of out-couplers comprises grating out-couplers for out-coupling the portions of the first output light beam to form the first array of out-coupled beam portions.

5. The waveguide illuminator of claim 4, wherein the first input light beam comprises light of first, second, and third color channels, the waveguide illuminator further comprising a volume Bragg grating (VBG) in an optical path of the first array of out-coupled beam portions, wherein the VBG is configured to redirect light of at least two of the first, second, and third color channels in the first array of out-coupled beam portions, such that the light of the first, second, and third color channels downstream of the VBG propagates substantially at a same chief ray angle.

6. The waveguide illuminator of claim 4, wherein at least one of:
   the grating out-couplers are chirped to focus the out-coupled beam portions; or
   the waveguide illuminator comprises an array of microlenses coupled to the grating out-couplers to focus the out-coupled beam portions;
   the waveguide illuminator further comprising an array of color-selective redirectors downstream of the grating out-couplers configured such that light of first, second, and third color channels downstream of the array of color-selective redirectors propagates substantially at a same chief ray angle.

7. The waveguide illuminator of claim 6, wherein the array of color-selective redirectors comprises an array of microprisms.

8. The waveguide illuminator of claim 6, wherein the array of color-selective redirectors comprises an array of chirped gratings.

9. The waveguide illuminator of claim 1, wherein the first input light beam carries light of a first color channel, the waveguide illuminator further comprising:
   a second input waveguide in the linear waveguide area, for guiding a second input light beam of a second color channel;
   a second splitter in the linear waveguide area, coupled to the second input waveguide for splitting the second input light beam into a plurality of sub-beams;
   a second plurality of linear waveguides in the linear waveguide area, coupled to the second splitter for receiving and guiding the plurality of sub-beams split from the second input light beam to a boundary between the linear waveguide and slab waveguide areas for forming a second output light beam propagating in the slab waveguide area; and
   a second array of out-couplers spaced apart from one another in the slab waveguide area for out-coupling portions of the second output light beam to form a second array of out-coupled beam portions.

10. The waveguide illuminator of claim 9, wherein:
    the slab waveguide area comprises first and second slab waveguide layers for guiding therein the first and second output light beams, respectively;
    the first and second pluralities of linear waveguides are coupled to the first and second slab waveguide layers respectively; and
    the first and second arrays of out-couplers are disposed in the first and second slab waveguide layers respectively and configured to out-couple the portions of the first and second output light beams respectively at a substantially same chief ray angle.

11. The waveguide illuminator of claim 9, wherein:
    the slab waveguide area supports first and second transversal modes of propagation;
    the first and second pluralities of linear waveguides are configured to couple the respective pluralities of sub-beams into the first and second transversal modes respectively; and
    the first and second arrays of out-couplers are configured to out-couple the portions of the first and second output light beams respectively at a substantially same chief ray angle.

12. The waveguide illuminator of claim 1, wherein:
    the slab waveguide area comprises a slab waveguide layer for propagating the first output light beam therein; and
    the first array of out-couplers comprises an array of prisms evanescently coupled to the slab waveguide layer for out-coupling the portions of the first output light beam out of the waveguide illuminator to form the first array of out-coupled beam portions.

13. A display device comprising:
    a waveguide illuminator comprising:
      adjacent linear waveguide and slab waveguide areas;
      an input waveguide in the linear waveguide area, for guiding an input light beam;
      a splitter coupled to the input waveguide for splitting the input light beam into a plurality of sub-beams;
      a plurality of linear waveguides in the linear waveguide area, coupled to the splitter for receiving and guiding the plurality of sub-beams split from the input light beam to a boundary between the linear waveguide and slab waveguide areas for forming an output light beam propagating in the slab waveguide area; and an array of out-couplers spaced apart from one another in the slab waveguide area for out-coupling portions of the output light beam to form an array of out-coupled beam portions; and a display panel comprising an array of display pixels disposed and configured to receive the array of the out-coupled beam portions.

14. The display device of claim 13, wherein a pitch of the display pixels is substantially equal to a pitch of the array of out-couplers.

15. The display device of claim 13, further comprising a light source for providing the input light beam to the input waveguide.

16. The display device of claim 15, wherein the light source is a polarized light source, wherein the input and output light beams and the array of out-coupled beam portions are polarized;

wherein the array of display pixels comprises an array of tunable polarization rotators for tuning polarization of individual beam portions of the array of out-coupled beam portions.

17. The display device of claim 15, wherein the light source comprises a monochromatic light source, wherein the input light beam has a wavelength of a first color channel.

18. A method for illuminating a display panel, the method comprising:

guiding a first input light beam in a first input linear waveguide of a waveguide illuminator;

splitting the first input light beam into a plurality of sub-beams;

guiding the plurality of sub-beams of the first input light beam in a first plurality of linear waveguides of the waveguide illuminator to a slab waveguide area of the waveguide illuminator;

propagating the plurality of sub-beams of the first input light beam in the slab waveguide area to form a first output light beam propagating in the slab waveguide area; and out-coupling portions of the first output light beam to form a first array of out-coupled beam portions.

19. The method of claim 18, further comprising expanding the plurality of sub-beams in waveguide tapers of the first plurality of linear waveguides before coupling the plurality of sub-beams to the slab waveguide area.

20. The method of claim 18, further comprising:

guiding a second input light beam in a second input linear waveguide of the waveguide illuminator;

splitting the second input light beam into a plurality of sub-beams;

guiding the plurality of sub-beams of the second input light beam in a second plurality of linear waveguides of the waveguide illuminator to a slab waveguide area of the waveguide illuminator;

propagating the plurality of sub-beams of the second input light beam in the slab waveguide area to form a second output light beam propagating in the slab waveguide area; and out-coupling portions of the second output light beam to form a second array of out-coupled beam portions.

* * * * *